US012693569B2

(12) United States Patent
Zhao et al.

(10) Patent No.: US 12,693,569 B2
(45) Date of Patent: Jul. 28, 2026

(54) LIGHT VALVE DEVICE, LIGHT CONTROL PARTICLES, AND PREPARATION METHOD THEREFOR

(71) Applicant: ZHEJIANG JINGYI NEW MATERIAL TECHNOLOGY CO. LTD, Taizhou (CN)

(72) Inventors: Shiyong Zhao, Dorval (CA); Yanan Li, Dorval (CA); Dawei Zhang, Dorval (CA); Shuyong Xiao, Dorval (CA); Yuzhe Zhang, Taizhou (CN); Bin Liang, Taizhou (CN)

(73) Assignee: ZHEJIANG JINGYI NEW MATERIAL TECHNOLOGY CO. LTD, Zhejiang (CN)

( * ) Notice: Subject to any disclaimer, the term of this patent is extended or adjusted under 35 U.S.C. 154(b) by 342 days.

(21) Appl. No.: 18/730,760

(22) PCT Filed: Aug. 15, 2022

(86) PCT No.: PCT/CN2022/112358
§ 371 (c)(1),
(2) Date: Jul. 21, 2024

(87) PCT Pub. No.: WO2023/035864
PCT Pub. Date: Mar. 16, 2023

(65) Prior Publication Data
US 2025/0093728 A1 Mar. 20, 2025

(30) Foreign Application Priority Data
Sep. 8, 2021 (CN) ........................ 202111049286.9

(51) Int. Cl.
*G02F 1/16755* (2019.01)
*G02F 1/1676* (2019.01)

(52) U.S. Cl.
CPC ........ *G02F 1/16755* (2019.01); *G02F 1/1676* (2019.01)

(58) Field of Classification Search
CPC .......................... G02F 1/16755; G02F 1/1676
(Continued)

(56) References Cited

U.S. PATENT DOCUMENTS 6,114,405 A 9/2000 Zhuang et al.
6,620,342 B1 9/2003 Burchill et al.
(Continued)

FOREIGN PATENT DOCUMENTS

CN 1350048 A 5/2002
CN 103820022 A 5/2014
(Continued)

OTHER PUBLICATIONS

International Search Report for PCT/CN2022/112358 mailed Nov. 11, 2022, ISA/CN.
(Continued)

*Primary Examiner* — Wyatt A Stoffa
*Assistant Examiner* — Mitchell T Oestreich
(74) *Attorney, Agent, or Firm* — Yue (Robert) Xu; Apex Attorneys at Law, LLP

(57) ABSTRACT

The present invention provides a light valve device. Compared with the existing technology, the main bodies of the solid light control particles adopted by the light valve device provided by the present invention are inorganic-organic complexes, being non-blue solid particles. When no electrical field is applied (off-state), solid light control particles within a droplet of a suspension medium exhibit random dispersion due to Brownian motion; at this time, a light beam entering a light valve is absorbed and/or scattered, the light valve has poor light transmittance and is relatively dark, and the dark state is a non-blue tone. When an electrical field is applied (on-state), the solid light control particles are polarized by the electrical field, and the morphology and state of the solid light control particles are changed, thereby affecting the absorption/scattering and transmission of light by the light valve, so that most of the light can pass through the light valve, and the light valve has enhanced light transmission and relatively bright. Thus, the modulation of the primary color in the dark state of the light valve device is achieved.

13 Claims, 2 Drawing Sheets

(58) Field of Classification Search
USPC .......................................................... 359/296
See application file for complete search history.

(56) References Cited

U.S. PATENT DOCUMENTS

| | | | |
|---|---|---|---|
| 2019/0002758 | A1 | 1/2019 | Igawa et al. |
| 2019/0064626 | A1 | 2/2019 | Zhu et al. |

FOREIGN PATENT DOCUMENTS

| | | | | | |
|---|---|---|---|---|---|
| CN | 108779113 | A | | 11/2018 | |
| CN | 109856884 | A | | 6/2019 | |
| CN | 112882258 | A | | 6/2021 | |
| CN | 112882301 | A | * | 6/2021 | ......... G02F 1/15165 |
| GB | 2252973 | A | | 8/1992 | |
| JP | 2013242443 | A | | 12/2013 | |
| WO | 2021097740 | A | | 5/2021 | |

OTHER PUBLICATIONS

Chinese First Office Action issued on Dec. 1, 2023 for the the Chinese priority application No. 202111049286.9.
European Search Report issued on Nov. 22, 2024 for the European counterpart application No. 22866338.1.

* cited by examiner

LIGHT VALVE DEVICE, LIGHT CONTROL PARTICLES, AND PREPARATION METHOD THEREFOR

This is a US National Phase application based upon PCT Application No. PCT/CN2022/112358, titled "LIGHT VALVE DEVICE, LIGHT CONTROL PARTICLES, AND PREPARATION METHOD THEREFOR", filed on Aug. 15, 2022, which claims the priority to Chinese Patent Application No. 202111049286.9, titled "LIGHT VALVE DEVICE, LIGHT CONTROL PARTICLES, AND PREPARATION METHOD THEREFOR", filed on Sep. 8, 2021 with the China National Intellectual Property Administration, the disclosures of which are incorporated herein by reference in their entirety.

FIELD

The present disclosure belongs to the technical field of light valve, and in particular relates to a light valve device with a non-blue tone, a light-control particle, and a preparation method thereof.

BACKGROUND

A light valve is a device that can adjust the transmittance rate of light passing through itself. In particular, in the present disclosure, a light valve refers to a device that can control the transmittance rate of light by adjusting the voltage applied thereto. The device is also known as an electro-light-control device. Specifically, a light valve (hereinafter referred to as LV) is a device that can control the transmittance of light passing through a medium by adjusting the alternating current (AC) voltage applied to the medium. The light valve has advantages of actively regulating light transmittance rate and energy saving. The device can be configured as a smart window in spacecraft, high-speed train, automobile, building, and the like, a rearview mirror, sunglasses, a display, and the like.

Depending on the substrate of a light valve, a light valve includes a light valve with a plastic sheet such as PET as the substrate, which is called a light-control film herein, and a light valve with glass as the substrate, which is called a light-control glass herein. After the light-control film is laminated, it is called a light-control glass component.

Eighty-seven years ago, a light valve device containing nanoparticles was invented. Although the light-control film with suspended particles has been successfully developed for many years, the dark state of the light-control film is blue. In practical applications, people are less fond of this cold color and prefer non-blue colors such as a mid-tone color gray.

It can be seen that in the previous technology, the dark state of a light valve with suspended particles is blue. Such monotonous cold color cannot meet people's needs for a variety of colors. Therefore, there is a need to develop a technology to better modulate the primary color of the dark state of a light valve.

SUMMARY

In view of this, the technical problem to be solved by the present disclosure is to provide a light valve device with a non-blue tone, a light-control particle and a preparation method thereof.

The present disclosure provides a light valve device, comprising:

- a first transparent substrate,
- a first transparent electrode formed on the first transparent substrate,
- a second transparent substrate,
- a second transparent electrode formed on the second transparent substrate, wherein the first transparent electrode and the second transparent electrode are arranged opposite to each other, and
- a light-control layer disposed between the first transparent electrode and the second transparent electrode; wherein the light-control layer comprises a polymer matrix;
- wherein, suspension medium droplets are dispersed in the polymer matrix, and solid light-control particles are distributed within the suspension medium droplets;
- the solid light-control particle is formed from raw materials comprising the following components: iodine, main group metal iodide, transition metal organic complex and/or rare earth metal organic complex, nitrogen-containing organic ligand and nitrocellulose;
- the light valve device has a non-blue tone in the dark state and is transparent in the bright state;
- the non-blue tone is: in the CIELab color coordinate, $10<L<40$, $-5<a<5$, $-1.5<b<5$.

Preferably, a mass ratio of the iodine, main group metal iodide, transition metal organic complex and/or rare earth metal organic complex, nitrogen-containing organic ligand and nitrocellulose is 1:(0.2~1):(0.05~1):(0.2~2):(0.01~3).

Preferably, the main group metal iodide is selected from the group consisting of lithium iodide, sodium iodide, potassium iodide, rubidium iodide, cesium iodide, ammonium iodide, magnesium iodide, calcium iodide, strontium iodide, barium iodide, indium iodide, tin iodide, lead iodide and a combination thereof; the transition metal organic complex and/or rare earth metal organic complex is selected from the group consisting of titanium acetylacetonate (III), titanium acetylacetonate (IV), vanadium acetylacetonate, chromium acetylacetonate, manganese acetylacetonate (II), manganese acetylacetonate (III), iron acetylacetonate (II), iron acetylacetonate (III), cobalt acetylacetonate (II), cobalt acetylacetonate (III), nickel acetylacetonate, copper acetylacetonate, zirconium acetylacetonate, molybdenum acetylacetonate, ruthenium acetylacetonate, rhodium acetylacetonate, palladium acetylacetonate, iridium acetylacetonate, yttrium acetylacetonate, lanthanum acetylacetonate, cerium acetylacetonate, europium acetylacetonate, dysprosium acetylacetonate, ferrocene, cobaltenocene, nickelrocene, manganocene, titanocene, chromocene, cuprocene, ruthenocene, vanadocene, zirconocene, lanthanocene, copper phthalocyanine, nickel phthalocyanine, zinc phthalocyanine, cobalt phthalocyanine, iron phthalocyanine, vanadium phthalocyanine, manganese phthalocyanine, chromium phthalocyanine, ruthenium phthalocyanine, zirconium phthalocyanine, lanthanum phthalocyanine, copper porphyrin, cobalt porphyrin, nickel porphyrin, iron porphyrin, vanadium porphyrin, ruthenium porphyrin, zirconium porphyrin, lanthanum porphyrin and a combination thereof;

- the nitrogen-containing organic ligand is selected from a nitrogen-containing heterocyclic carboxylic acid ligand and/or a nitrogen-containing heterocyclic carboxylic acid ester ligand.

Preferably, the nitrogen-containing organic ligand is selected from the group consisting of compounds represented by Formula (1) to Formula (16):

Formula (1)

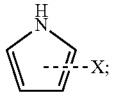

in Formula (1), X is $(COOH)_n$ or $(COOR)_n$, and n is an integer from 1 to 4;

Formula (2)

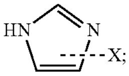

in Formula (2), X is $(COOH)_n$ or $(COOR)_n$, and n is an integer from 1 to 3;

Formula (3)

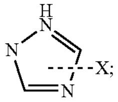

in Formula (3), X is $(COOH)_n$ or $(COOR)_n$, and n is an integer between 1 and 2;

Formula (4)

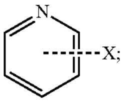

in Formula (4), X is $(COOH)_n$ or $(COOR)_n$, and n is an integer from 1 to 5;

Formula (5)

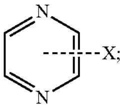

in Formula (5), X is $(COOH)_n$ or $(COOR)_n$, and n is an integer from 1 to 4;

Formula (6)

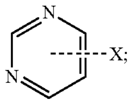

in Formula (6), X is $(COOH)_n$ or $(COOR)_n$, and n is an integer from 1 to 4;

Formula (7)

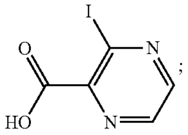

-continued

Formula (8)

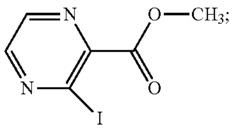

Formula (9)

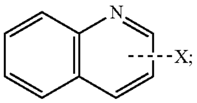

in Formula (9), X is $(COOH)_n$ or $(COOR)_n$, and n is an integer from 1 to 7;

Formula (10)

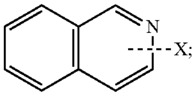

in Formula (10), X is $(COOH)_n$ or $(COOR)_n$, and n is an integer from 1 to 7;

Formula (11)

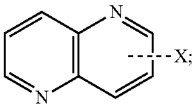

in Formula (11), X is $(COOH)_n$ or $(COOR)_n$, and n is an integer from 1 to 6;

Formula (12)

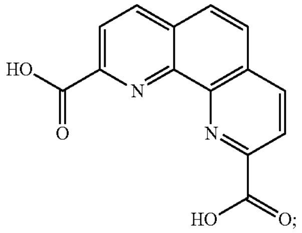

Formula (13)

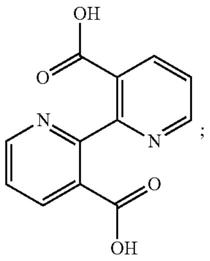

Formula (14)

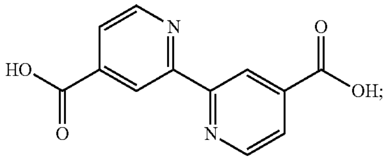

-continued

Formula (15)

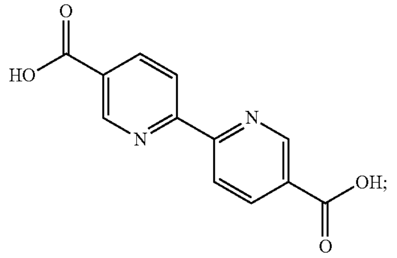

Formula (16)

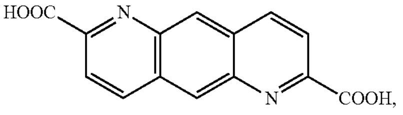

and a combination thereof;

wherein, R in Formulas (1) to (6) and Formulas (9) to (11) are each independently selected from C1 to C6 alkyl.

Preferably, the solid light-control particle has a particle length of 50 nm to 800 nm; the solid light-control particle has a particle aspect ratio of 2 to 30.

Preferably, the polymer matrix is formed by cross-linking and curing of a silicone oil polymer matrix precursor having unsaturated bonds;

the suspension medium droplet is a non-conductive liquid, which is selected from the group consisting of fluorocarbon organic compound, phthalate, trimellitate, dodecylbenzene, polybutylene oil, polyacrylate, polymethacrylate, epoxidized soybean oil, epoxidized linseed oil and a combination thereof.

Preferably, the first transparent substrate and the second transparent substrate comprise a glass plate; or the first transparent substrate and the second transparent substrate comprise a transparent plastic sheet.

Preferably, the first transparent electrode is selected from the group consisting of ITO, FZO, IZO, GZO, AZO, a nano-Ag wire, conductive graphene, a nano-Cu wire and a combination thereof; the second transparent electrode is selected from the group consisting of ITO, FZO, IZO, GZO, AZO, a nano-Ag wire, conductive graphene, a PEDOT conductive layer, a nano-Cu wire and a combination thereof.

Preferably, an insulating layer is provided on the first transparent electrode and/or the second transparent electrode.

The present disclosure further provides a method for preparing the above-mentioned light valve device, comprising:

providing a solid light-control particle;

providing a suspension medium;

mixing the solid light-control particle and the suspension medium to form a mixture of the suspension medium containing the solid light-control particle;

providing a polymer matrix precursor;

mixing an initiator that initiates cross-linking and curing of the polymer matrix precursor, the mixture of the suspension medium containing the solid light-control particle, and the polymer matrix precursor to obtain a light-control layer matrix emulsion;

coating the above-mentioned light-control layer matrix emulsion on the first transparent electrode of the first transparent substrate to form a light-control layer wet film;

covering the second transparent electrode of the second transparent substrate on the light-control layer wet film;

cross-linking and curing the light-control layer wet film to obtain the light valve device.

The present disclosure further provides a solid light-control particle, which is formed from raw materials comprising the following components: iodine, main group metal iodide, transition metal organic complex and/or rare earth metal organic complex, nitrogen-containing organic ligand and nitrocellulose.

The present disclosure further provides a method for preparing a solid light-control particle, comprising:

S1) mixing iodine, main group metal iodide, transition metal organic complex and/or rare earth metal organic complex, nitrocellulose and an organic solvent, then adding low carbon alcohol, distilled water and nitrogen-containing organic ligand, and reacting under stirring to obtain a reaction solution;

S2) centrifuging the reaction solution under a condition of not higher than 5000 g to obtain a supernatant;

S3) centrifuging the supernatant under a condition of not less than 10,000 g to obtain the solid light-control particle.

Preferably, the organic solvent is selected from isoamyl acetate;

the number of carbon atoms of the low carbon alcohol is less than 8;

the mixing is conducted at a temperature of 5° C. to 150° C.;

the reacting under stirring is conducted at a temperature of 5° C. to 150° C. for 0.1 h to 20 h;

the centrifuging in step S2) is performed for 0.2 h to 2 h;

the centrifuging in step S3) is performed for 0.5 h to 20 h.

The present disclosure further provides a light-control glass component, comprising a first glass plate, a second glass plate, and the above-mentioned light valve device disposed between the first glass plate and the second glass plate; the first transparent substrate and the second transparent substrate are transparent plastic sheets;

a first laminated layer is provided between the first glass plate and the light valve device, and/or a second laminated layer is provided between the second glass plate and the light valve device.

The present disclosure provides a light valve device, comprising a first transparent substrate, a first transparent electrode formed on the first transparent substrate, a second transparent substrate, a second transparent electrode formed on the second transparent substrate, wherein the first transparent electrode and the second transparent electrode are arranged oppositely, and a light-control layer arranged between the first transparent electrode and the second transparent electrode; the light-control layer comprises a polymer matrix; wherein suspension medium droplets are dispersed in the polymer matrix, and the suspension medium droplets are distributed with solid light-control particles; the solid light-control particles are formed from raw materials comprising the following components: iodine, main group metal iodide, transition metal organic complex and/or rare earth metal organic complex, nitrogen-containing organic ligand and nitrocellulose. Compared with the prior art, the main body of the solid light-control particle used in the light valve device according to the present disclosure is an inorganic-organic complex, which is a non-blue solid particle. In a case that no electric field is applied (off state), the solid light-control particles in the suspension medium droplets are randomly dispersed due to Brownian motion. At this time, the light beam entering the light valve is absorbed and/or scattered. The light valve has poor light transmittance and is relatively dark, and the dark state thereof has a non-blue tone. In a case that an electric field is applied (on state), the solid light-control particles are polarized by the electric field, and their morphology and state are changed, thereby affecting the absorption/scattering and transmission of light by the light valve, so that most of light can pass through the light valve. The light valve has enhanced light transmittance and is relatively bright, which realizes the modulation of primary color of the light valve device in the dark state.

Tests have shown that the light valve device produced with solid light-control particles of the present disclosure has a total light transmittance rate reaching 69.1%, and a dark state with a non-blue tone, L=33.72, a=0.15, b=−0.81, which overcomes the shortcoming of the conventional technology that the dark state of a light valve has a single blue tone, achieves good technical effects, and has good application prospects.

DETAILED DESCRIPTION OF EMBODIMENTS

Figure 1A:
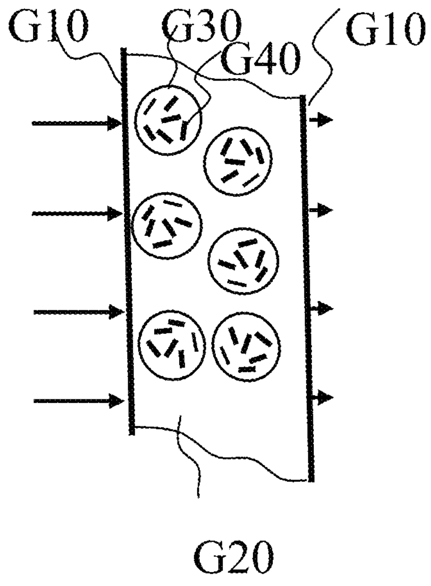
FIG. 1*a* is a schematic structural diagram of the light valve device according to the present disclosure before being energized.

The technical solutions in the embodiments of the present disclosure will be clearly and completely described below with reference to the examples of the present disclosure. Apparently, the described examples are only some, not all of the embodiments of the present disclosure. Based on the embodiments of the present disclosure, all other embodiments obtained by those of ordinary skill in the art without making inventive efforts fall within the scope of protection of the present disclosure.

The present disclosure provides a solid light-control particle, which is formed from raw materials comprising the following components: iodine, main group metal iodide, transition metal organic complex and/or rare earth metal organic complex, nitrogen-containing organic ligand and nitrocellulose.

Wherein, the iodine, main group metal iodide, transition metal organic complex and/or rare earth metal organic complex, nitrogen-containing organic ligand and nitrocellulose are in a mass ratio of preferably 1:(0.2 to 1):(0.05 to 1):(0.2 to 2):(0.01 to 3), more preferably 1:(0.2 to 1):(0.1 to 1):(0.2 to 1.5):(0.05 to 3), further more preferably 1:(0.5 to 1):(0.1 to 1):(0.2 to 1):(0.2 to 3).

The main group metal iodide is preferably selected from the group consisting of lithium iodide, sodium iodide, potassium iodide, rubidium iodide, cesium iodide, ammonium iodide, magnesium iodide, calcium iodide, strontium iodide, barium iodide, indium iodide, tin iodide, lead iodide and a combination thereof.

The transition metal organic complex and/or rare earth metal organic complex is preferably selected from the group consisting of organic complexes of titanium, vanadium, chromium, manganese, iron, cobalt, nickel, copper, zirconium, molybdenum, ruthenium, rhodium, palladium, iridium, yttrium, lanthanum, cerium, europium and dysprosium, and a combination thereof, more preferably selected from the group consisting of titanium acetylacetonate (III), titanium acetylacetonate (IV), vanadium acetylacetonate, chromium acetylacetonate, manganese acetylacetonate (II), manganese acetylacetonate (III), iron acetylacetonate (II), iron acetylacetonate (III), cobalt acetylacetonate (II), cobalt acetylacetonate (III), nickel acetylacetonate, copper acetylacetonate, zirconium acetylacetonate, molybdenum acetylacetonate, ruthenium acetylacetonate, rhodium acetylacetonate, palladium acetylacetonate, iridium acetylacetonate, yttrium acetylacetonate, lanthanum acetylacetonate, cerium acetylacetonate, europium acetylacetonate, dysprosium acetylacetonate, ferrocene, cobaltenocene, nickelrocene, manganocene, titanocene, chromocene, cuprocene, ruthenocene, vanadocene, zirconocene, lanthanocene, copper phthalocyanine, nickel phthalocyanine, zinc phthalocyanine, cobalt phthalocyanine, iron phthalocyanine, vanadium phthalocyanine, manganese phthalocyanine, chromium phthalocyanine, ruthenium phthalocyanine, zirconium phthalocyanine, lanthanum phthalocyanine, copper porphyrin, cobalt porphyrin, nickel porphyrin, iron porphyrin, vanadium porphyrin, ruthenium porphyrin, zirconium porphyrin, lanthanum porphyrin and a combination thereof.

The nitrogen-containing organic ligand is preferably a nitrogen-containing heterocyclic carboxylic acid ligand and/or a nitrogen-containing heterocyclic carboxylic acid ester ligand; wherein the nitrogen-containing heterocycle can be a five-membered heterocycle, a six-membered heterocycle or a condensed heterocycle. In the present disclosure, the nitrogen-containing organic ligand is preferably selected from the group consisting of compounds represented by Formula (1) to Formula (16):

Formula (1)

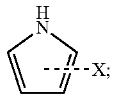

in Formula (1), X is $(COOH)_n$ or $(COOR)_n$, and n is an integer from 1 to 4;

Formula (2)

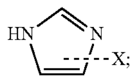

in Formula (2), X is $(COOH)_n$ or $(COOR)_n$, and n is an integer from 1 to 3;

Formula (3)

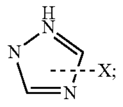

in Formula (3), X is $(COOH)_n$ or $(COOR)_n$, and n is an integer between 1 and 2;

Formula (4)

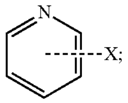

in Formula (4), X is $(COOH)_n$ or $(COOR)_n$, and n is an integer from 1 to 5;

Formula (5)

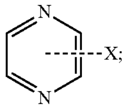

in Formula (5), X is $(COOH)_n$ or $(COOR)_n$, and n is an integer from 1 to 4;

Formula (6)

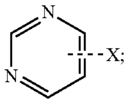

in Formula (6), X is $(COOH)_n$ or $(COOR)_n$, and n is an integer from 1 to 4;

Formula (7)

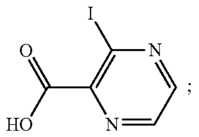

Formula (8)

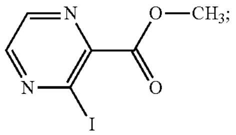

Formula (9)

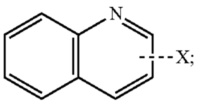

in Formula (9), X is $(COOH)_n$ or $(COOR)_n$, and n is an integer from 1 to 7;

Formula (10)

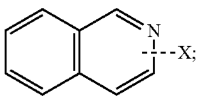

in Formula (10), X is $(COOH)_n$ or $(COOR)_n$, and n is an integer from 1 to 7;

Formula (11)

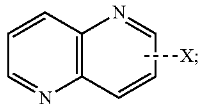

in Formula (11), X is $(COOH)_n$ or $(COOR)_n$, and n is an integer from 1 to 6;

Formula (12)

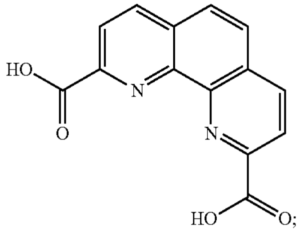

Formula (13)

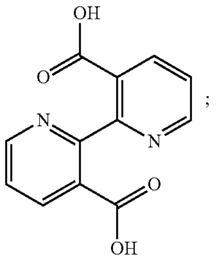

Formula (14)

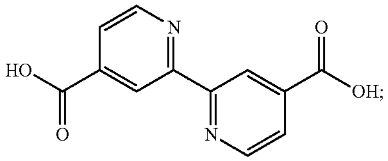

Formula (15)

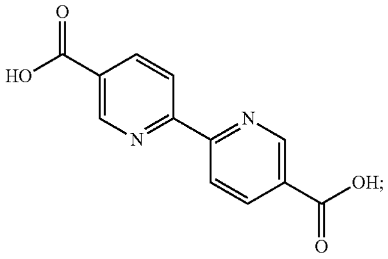

Formula (16)

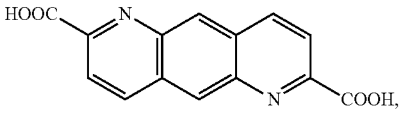

and a combination thereof;

wherein, R in Formulas (1) to (6) and Formulas (9) to (11) are each independently selected from C1 to C6 alkyl, more preferably C1 to C4 alkyl, further more preferably C1 to C3 alkyl. In the above structure, unless otherwise specified, n is the number of substituents on the nitrogen-containing heterocycle in the nitrogen-containing organic ligand.

The nitrocellulose can be nitrocellulose well known to those skilled in the art, and SS1/4S is used in the present disclosure.

The solid light-control particle according to the present disclosure is non-blue solid particle, and its main body is an inorganic-organic complex. The metal atoms in the metal iodide and the metal organic complex form chemical bonds with the nitrogen atoms in the nitrogen-containing organic ligand. Iodine also forms polyiodine complex with the metal atoms in the metal iodide and the metal organic complex. The selected nitrocellulose can inhibit the agglomeration of the nanoparticles formed, control the growth rate of different crystal faces, and promote the rapid growth of one crystal face prior to other crystal faces, thereby producing a rod-like morphology.

The solid light-control particle according to the present disclosure has a particle length of preferably 50 nm to 800 nm, more preferably 100 nm to 600 nm, further preferably 200 nm to 500 nm, further preferably 240 nm to 480 nm, further preferably 260 nm to 450 nm, most preferably 260 nm to 435 nm. In an embodiment according to the present disclosure, the solid light-control particle has a particle length of specifically 310 nm, 328 nm, 298 nm, 265 nm, 411 nm or 432 nm. The solid light-control particle has a rod-like morphology, and thus has a certain aspect ratio. In the present disclosure, the solid light-control particle has a particle aspect ratio of preferably 2 to 30, more preferably 2 to 20, further more preferably 4 to 10, and most preferably 4.5 to 5.5. In an embodiment according to the present disclosure, the solid light-control particle has a particle aspect ratio of specifically 4.5, 4.8, 5 or 5.5.

The present disclosure further provides a method for preparing the above-mentioned solid light-control particle, comprising: S1) mixing iodine, main group metal iodide, transition metal organic complex and/or rare earth metal organic complex, nitrocellulose and an organic solvent, then adding low carbon alcohol, distilled water and nitrogen-containing organic ligand, and reacting under stirring to obtain a reaction solution; S2) centrifuging the reaction solution under a condition of not higher than 5000 g to obtain a supernatant; S3) centrifuging the supernatant under a condition of not less than 10,000 g to obtain the solid light-control particle.

The present disclosure has no special restrictions on the sources of all raw materials, as long as they are commercially available. The types and proportions of the iodine, main group metal iodide, transition metal organic complex and/or rare earth metal organic complex, nitrocellulose and nitrogen-containing organic ligand are the same as those mentioned above, and will not be described again here.

The iodine, main group metal iodide, transition metal organic complex and/or rare earth metal organic complex, nitrocellulose and organic solvent are mixed, then the low carbon alcohol, distilled water and nitrogen-containing organic ligand are added, and the mixture is stirred for reaction to obtain a reaction solution, wherein the organic solvent is preferably an organic solvent that can dissolve nitrocellulose, and more preferably isoamyl acetate; the mixing is conducted at a temperature of preferably 5° C. to 150° C., more preferably 20° C. to 120° C., further more preferably 30° C. to 100° C., most preferably 40° C. to 80° C. After mixing until the iodine is dissolved, the low carbon alcohol, distilled water and nitrogen-containing organic ligand are added, and the mixture is stirred for reaction; the stirring for reaction is conducted at a temperature of preferably 5° C. to 150° C., more preferably 20° C. to 120° C., further more preferably 30° C. to 100° C., most preferably 40° C. to 80° C., for preferably 0.1 h to 20 h, more preferably 0.5 h to 15 h, further more preferably 2 h to 12 h, most preferably 4 h to 6 h. The water and low-carbon alcohol added in the preparation method balance the inorganic-organic complex in the form of hydrogen bonds or coordination bonds, play a role in balancing charges, and render the structure of the inorganic-organic complex to be more stable.

The reaction solution is centrifuged under conditions of no more than 5000 g to remove large particle product and obtain a supernatant; the centrifuging is conducted at preferably 500 g to 4000 g, more preferably 1000 g to 3000 g, further more preferably 1000 g to 2000 g, most preferably 1350 g, for preferably 0.2 h to 2 h, more preferably 0.5 h to 1 h.

The supernatant is centrifuged under conditions of no less than 10,000 g; the centrifuging is conducted at preferably 10,000 g to 40,000 g, more preferably 10,000 g to 30,000 g, further more preferably 15,000 g to 20,000 g, most preferably 18,000 g, for preferably 0.5 h to 20 h, more preferably 2 h to 15 h, further more preferably 4 h to 10 h, most preferably 5 h to 8 h. The supernatant is discarded after centrifugation to obtain the solid light-control particle.

The present disclosure further provides a light valve device, comprising the above-mentioned solid light-control particle.

The present disclosure further provides a light valve device, comprising a first transparent substrate, a first transparent electrode formed on the first transparent substrate, a second transparent substrate, a second transparent electrode formed on the second transparent substrate, wherein the first transparent electrode and the second transparent electrode are arranged oppositely, and a light-control layer arranged between the first transparent electrode and the second transparent electrode; the light-control layer comprises a polymer matrix; wherein, suspension medium droplets are dispersed in the polymer matrix, and solid light-control particles are distributed within the suspension medium droplets; the solid light-control particle is formed from raw materials comprising the following components: iodine, main group metal iodide, transition metal organic complex and/or rare earth metal organic complex, nitrogen-containing organic ligand and nitrocellulose.

The light valve device according to the present disclosure has a non-blue tone in the dark state and is transparent in the bright state; the non-blue tone is: in the CIELab color coordinate, $10<L<40$, $-5<a<5$, $-1.5<b<5$; preferably, the non-blue tone is specifically: in the CIELab color coordinate, $10<L<40$, $-2<a<5$, $-1.5<b<2$.

The light valve device according to the present disclosure is preferably an electro-light-control film that can be adjusted between dark and bright states by being energized or not; the energization method is preferably alternating current; and an effective value of the alternating current is preferably 5 V to 500 V.

The light valve device comprises a first transparent substrate and a second transparent substrate; the first transparent substrate and the second transparent substrate can only be transparent substrates well known to those skilled in the art, and there is no special limitation. In the present disclosure, the first transparent substrate and the second transparent substrate are preferably glass plates and/or plastic sheets.

A first transparent electrode is provided on the first transparent substrate; a second transparent electrode is provided on the second transparent substrate. The transparent electrode can be a transparent electrode well known to those skilled in the art, and there is no special limitation. In the present disclosure, the first transparent electrode is selected from the group consisting of ITO, FZO, IZO, GZO, AZO, a nano Ag wire, conductive graphene, a PEDOT conductive layer, a nano Cu wire and a combination thereof; the second transparent electrode is selected from the group consisting of ITO, FZO, IZO, GZO, AZO, a nano-Ag wire, conductive graphene, a PEDOT conductive layer, a nano-Cu wire and a combination thereof.

The first transparent substrate and the first transparent electrode formed on the first transparent substrate form a first conductive substrate; the second transparent substrate and the second transparent electrode formed on the second transparent substrate form a second conductive substrate. In the present disclosure, the first conductive substrate and the second conductive substrate are each independently preferably selected from the group consisting of ITO conductive glass, FTO conductive glass, FZO conductive glass, IZO (Indium Zinc Oxide) conductive glass, GZO (Ga. ZnO) conductive glass, AZO (Al-doped ZnO) conductive glass, ITO/PET conductive film, nano-Ag wire/PET conductive film, graphene conductive film, nano-Cu wire/PET conductive film, PEDOT conductive layer/PET, the above-mentioned conductive substrates containing an insulating layer covering the transparent electrode, and a combination thereof.

A light-control layer is provided between the two transparent electrodes; the light-control layer has a thickness of preferably 10 μm to 200 μm, more preferably 20 μm to 180 μm, further more preferably 30 μm to 150 μm, and most preferably 40 μm to 100 μm. In an embodiment according to the present disclosure, the light-control layer has a thickness of specifically 80 μm; the light-control layer comprises a polymer matrix; the polymer matrix is preferably formed by cross-linking and curing of an organic silicone oil polymer matrix precursor with unsaturated bonds, more preferably formed by cross-linking and UV-curing of an organic silicone oil polymer matrix precursor with unsaturated bonds.

A suspension medium is dispersed in the polymer matrix. In the present disclosure, the suspension medium is preferably dispersed within the polymer matrix in the form of droplets; the suspension medium is preferably a non-conductive liquid, and more preferably selected from the group consisting of fluorocarbon organic compound, phthalate, trimellitate, dodecylbenzene, polybutylene oil, polyacrylate, polymethacrylate, epoxidized soybean oil, epoxidized linseed oil and a combination thereof.

Solid light-control particles are dispersed in the suspension medium; the solid light-control particle is the same as described above and will not be elaborated here.

A mass ratio of the total mass of suspended medium droplets and solid light-control particles to the mass of the polymer matrix in the light valve device according to the present disclosure is preferably 1:(1 to 5), more preferably 1:(1.5 to 4), further more preferably 1:(2 to 3.5), most preferably 1:(2.2 to 3).

The suspension medium droplet and solid light-control particle are in a mass ratio of preferably (5 to 25):1, more preferably (10 to 20):1, and most preferably (12 to 18):1.

The main body of the solid light-control particle used in the light valve device according to the present disclosure is an inorganic-organic complex, which is a non-blue solid particle. In a case that no electric field is applied (off state), the solid light-control particles in the suspension medium droplets are randomly dispersed due to Brownian motion. At this time, the light beam entering the light valve is absorbed and/or scattered. The light valve has poor light transmittance and is relatively dark, and the dark state thereof has a non-blue tone. In a case that an electric field is applied (on state), the solid light-control particles are polarized by the electric field, and their morphology and state are changed, thereby affecting the absorption/scattering and transmission of light by the light valve, so that most of light can pass through the light valve. The light valve has enhanced light transmittance and is relatively bright, which realizes the modulation of primary color of the light valve device in the dark state.

Figure 1B:
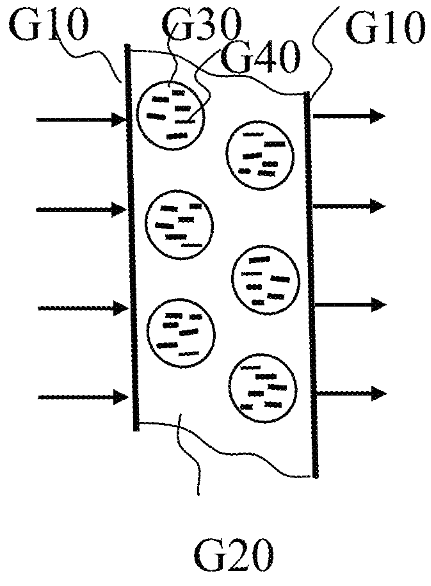
FIG. 1*b* is a schematic structural diagram of the light valve device according to the present disclosure after being energized.
Figure 2:
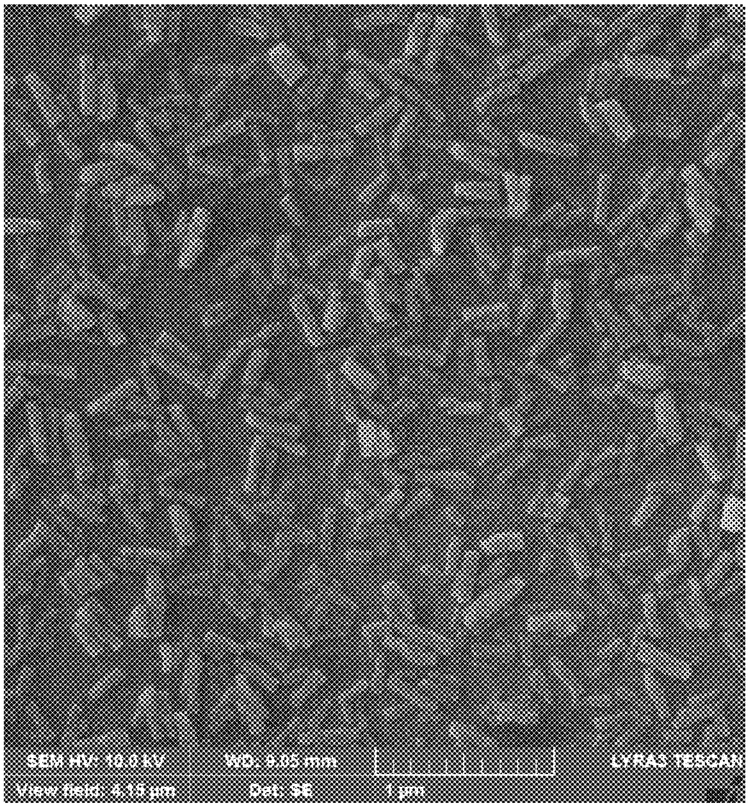
FIG. 2 is a scanning electron micrograph of the gray solid particles obtained in Example 2 of the present disclosure.

Referring to FIG. 1, in the light valve device produced by the present disclosure, in a case that no electric field is applied (off state), the solid light-control particles G40 in the suspended medium droplets G30 are randomly dispersed due to Brownian motion. At this time, the light beam entering the light valve is absorbed and/or scattered, so that the light valve has poor light transmittance and is relatively dark. The structure thereof is shown in FIG. 1*a*. In a case that an electric field is applied (on state), the solid light-control particles G40 are polarized by the electric field, and arranged in the direction parallel to each other along the electric field, so that most of the light beam can pass through the light valve, and the light valve has enhanced light transmittance and is relatively bright. The structure thereof is shown in FIG. 1*b*.

The present disclosure further provides a method for preparing the above-mentioned light valve device, comprising:

- providing a solid light-control particle;
- providing a suspension medium;
- mixing the solid light-control particle and the suspension medium to form a mixture of the suspension medium containing the solid light-control particle;
- providing a polymer matrix precursor;
- mixing an initiator that initiates cross-linking and curing of the polymer matrix precursor, the mixture of the suspension medium containing the solid light-control particle, and the polymer matrix precursor to obtain a light-control layer matrix emulsion;
- coating the above-mentioned light-control layer matrix emulsion on the first transparent electrode of the first transparent substrate to form a light-control layer wet film;
- covering the second transparent electrode of the second transparent substrate on the light-control layer wet film;
- cross-linking and curing the light-control layer wet film to obtain the light valve device.

The solid light-control particle, suspension medium, first transparent substrate, first transparent electrode, second transparent electrode and second transparent substrate are all the same as described above, and will not be elaborated here.

The solid light-control particle and the suspension medium are mixed to form a mixture of the suspension medium containing the solid light-control particle; a mass ratio of the suspension medium and the solid light-control particle is preferably (5 to 25):1, more preferably (10 to 20):1, most preferably (12 to 18):1.

A polymer matrix precursor is provided; the polymer matrix precursor is preferably an organic silicone oil with unsaturated bonds.

An initiator that initiates the cross-linking and curing of the polymer matrix precursor, the mixture of the suspension medium containing solid light-control particle, and the polymer matrix precursor are mixed to obtain a light-control layer matrix emulsion; the initiator is preferably a photoinitiator. The type of the photoinitiator in the present disclosure can be selected according to actual need, and there is no special restriction. In an embodiment of the present disclosure, the initiator is particularly photoinitiator 819; the mass of the photoinitiator is preferably 0.05% to 1%, more preferably 0.1% to 0.6%, further more preferably 0.2% to 0.5% of the mass of the polymer matrix precursor.

The above-mentioned light-control layer matrix emulsion is coated on the first transparent electrode of the first transparent substrate to form the light-control layer wet film; the second transparent electrode of the second transparent substrate is covered on the light-control layer wet film; the light-control layer wet film is cross-linked and cured to obtain the light valve device. The cross-linking and curing is preferably performed in a protective atmosphere; the protective atmosphere is preferably nitrogen; the cross-linking and curing is preferably UV curing; the UV curing is performed at a power of preferably 500 $W/m^2$ to 1000 $W/m^2$; the cross-linking and curing is performed for preferably 10 s to 120 s, more preferably 20 s to 80 s.

The present disclosure further provides a light-control glass component, comprising a first glass plate and a second glass plate, and the above-mentioned light valve device is disposed between the first glass plate and the second glass plate; the first transparent substrate and the second transparent substrate are transparent plastic sheets; a first laminated layer is provided between the first glass plate and the light valve device, and/or a second laminated layer is provided between the second glass plate and the light valve device.

In order to further illustrate the present disclosure, the light valve device, solid light-control particle and preparation method thereof according to the present disclosure will be described in detail below with reference to the examples.

The reagents used in the following examples are all commercially available.

Comparative Example 1: Preparation of a Blue Solid Light-Control Particle

The mass ratio of each raw material added was as follows: iodine:metal iodide:metal organic complex:nitrogen-containing organic ligand:nitrocellulose was 1:0.66:0:0.66:1.

30 g of isoamyl acetate solution containing 21.2 wt % nitrocellulose (SS1/4S), 6 g of $I_2$, 70 g of isoamyl acetate, and 4 g of anhydrous $CaI_2$ were added into a 250 ml three-neck round-bottomed glass flask, and heated to 42° C. After $I_2$ was dissolved, 6 g of anhydrous methanol, 0.85 g of distilled water and 4 g of 2,5-pyrazinedicarboxylic acid dihydrate were added into the three-neck round-bottomed glass flask. The mixture was heated at 42° C. and stirred for 4 h of reaction, and then cooled naturally.

The reaction solution was centrifuged at 1350 g for 0.5 h to remove large particle product. The supernatant was centrifuged at 18,000 g for 5 hours, and the supernatant was discarded to obtain the blue solid light-control particle. The blue solid light-control particle was fully dispersed with 250 ml of isoamyl acetate.

The result of SEM characterization shows that the blue solid light-control particle has a particle length of 280 nm, a particle width of 70 nm, and a particle aspect ratio of 4.

40 g of TDTM (tridecyl trimellitate) was added into a 250 ml round-bottomed glass flask, and the isoamyl acetate dispersion of the blue solid light-control particle prepared above was added in batches. Isoamyl acetate was removed using a rotary evaporator, and the mixture was finally processed using the rotary evaporator at 80° C. for 3 hours. After weighing, the mass of the solid light-control particle was calculated. Then an appropriate amount of TDTM was added and mixed evenly so that the solid light-control particle/TDTM was equal to 1/12. The suspension containing the blue solid light-control particle obtained was called LCP-0.

Example 1: Preparation of a Red Solid Light-Control Particle

The mass ratio of each raw material added was as follows: iodine:metal iodide:metal organic complex:nitrogen-containing organic ligand:nitrocellulose was 1:0.5:0.16:0.66:1.

30 g of isoamyl acetate solution containing 21.2 wt % nitrocellulose (SS1/4S), 6 g of $I_2$, 70 g of isoamyl acetate, 3 g of anhydrous $CaI_2$, 1 g of ferrocene were added into a 250 ml three-neck round-bottomed glass flask, and heated to 42° C. After $I_2$ was dissolved, 6 g of anhydrous methanol and 4 g of 2,5-pyrazinedicarboxylic acid dihydrate were added into the three-neck round-bottomed glass flask. The mixture was heated at 42° C. and stirred for 4 h of reaction, and then cooled naturally.

The reaction solution was centrifuged at 1350 g for 0.5 h to remove large particle product. The supernatant was centrifuged at 18,000 g for 5 hours, and the supernatant was discarded to obtain the red solid light-control particle. The red solid light-control particle was fully dispersed with 250 ml of isoamyl acetate.

The result of SEM characterization shows that the red solid light-control particle has a particle length of 310 nm, a particle width of 68 nm, and a particle aspect ratio of 4.5.

40 g of TDTM (tridecyl trimellitate) was added into a 250 ml round-bottomed glass flask, and the isoamyl acetate dispersion of the red solid light-control particle prepared above was added in batches. Isoamyl acetate was removed using a rotary evaporator, and the mixture was finally processed using the rotary evaporator at 80° C. for 3 hours. After weighing, the mass of the solid light-control particle was calculated. Then an appropriate amount of TDTM was added and mixed evenly so that the solid light-control particle/TDTM was equal to 1/12. The suspension containing the red solid light-control particle obtained was called LCP-1.

Example 2: Preparation of a Gray Solid Light-Control Particle

This example only differs from the method of Example 1 in that 1 g of ferrocene was replaced with 1.0 g of $Co(acac)_2$, and the mixture was heated at 46° C. and stirred for 2 hours of reaction. The result of SEM characterization shows that the gray solid light-control particle has a particle length of 328 nm, a particle width of 72 nm, and a particle aspect ratio of 4.5. The suspension containing the gray solid light-control particle obtained was called LCP-2.

Example 3: Preparation of a Gray Solid Light-Control Particle

This example only differs from the method of Example 1 in that 1 g of ferrocene was replaced with 1.0 g of Ni(acac) 2, and the mixture was heated at 45° C. and stirred for 2 hours of reaction. The result of SEM characterization shows that the gray solid light-control particle has a particle length of 298 nm, a particle width of 62 nm, and a particle aspect ratio of 4.8. The suspension containing the gray solid light-control particle obtained was called LCP-3.

Example 4: Preparation of a Green Solid Light-Control Particle

This example only differs from the method of Example 1 in that 1 g of ferrocene was replaced with 1.0 g of Fe(acac)

3, and the mixture was heated at 50° C. and stirred for 4 hours of reaction. The result of SEM characterization shows that the green solid light-control particle has a particle length of 265 nm, a particle width of 59 nm, and a particle aspect ratio of 4.5. The suspension containing the green solid light-control particle obtained was called LCP-4.

Example 5: Preparation of a Gray Solid Light-Control Particle

This example only differs from the method of Example 1 in that 1 g of ferrocene was replaced with 0.1 g of copper phthalocyanine, and the mixture was heated at 42° C. and stirred for 2 hours of reaction. The result of SEM characterization shows that the gray solid light-control particle has a particle length of 411 nm, a particle width of 82 nm, and a particle aspect ratio of 5.0. The suspension containing the gray solid light-control particle obtained was called LCP-5.

Example 6: Preparation of a Gray Solid Light-Control Particle

This example only differs from the method of Example 1 in that 1 g of ferrocene was replaced with 0.1 g of copper porphyrin, and the mixture was heated at 52° C. and stirred for 5 hours of reaction. The result of SEM characterization shows that the gray solid light-control particle has a particle length of 432 nm, a particle width of 78 nm, and a particle aspect ratio of 5.5. The suspension containing the gray solid light-control particle obtained was called LCP-6.

Comparative Example 2: Preparation of an Organic Silicone Oil Polymer Matrix Precursor with Unsaturated Bonds 108 g of hydroxyl-terminated dimethyldiphenylpolysiloxane and 380 mL of n-heptane were added into a 1 L three-neck round-bottomed glass flask. One side of the three-neck round-bottomed glass flask was connected to a water separator connected to a condenser tube, a mechanical stirrer was installed in the middle, and a thermometer was placed in the other side. The reaction solution in the three-neck round-bottomed glass flask was heated to reflux for 30 minutes. When a small amount of water appeared in the water separator, a solution of 0.26 g stannous octoate dissolved in 20 mL n-heptane was added. Then 6 g of 3-acryloyloxypropyltrimethoxysilane was added dropwise for about 5 minutes. Then the condensation reaction was carried out for 2 hours, and then 60 mL of trimethylmethoxysilane was added immediately as a reaction terminator. The reaction was terminated for 2 h, and then quickly cooled to room temperature. 100 ml of ethanol and the cooled reaction solution were mixed and stirred in a 2 L beaker, and the reaction bottle was washed with 60 mL of heptane, which was then poured into the beaker. After mixing evenly, 400 mL of methanol was added and stirred for 15 min. The obtained mixture was poured into a 2 L separatory funnel and left to stand for several hours, and then layer separation occurred. The lower layer liquid was taken out, and then processed using a rotary evaporator at 70° C. for 3 hours to remove low boiling-point matter to finally obtain the organic silicone oil with unsaturated bonds, which was the polymer matrix precursor.

Comparative Example 3: Preparation of LV-0 Light Valve with LCP-0

0.03 g of photoinitiator 819, 3.0 g of suspension LCP-0 of the solid light-control particle and 7.0 g of the organic silicone oil polymer matrix precursor with unsaturated bonds prepared in Comparative Example 2 were mixed evenly to obtain a light-control layer matrix emulsion.

The light-control layer matrix emulsion prepared above was coated on PET/ITO transparent electrode with a blade-type automatic film coater (MSK-AFA-III type, MTI Corporation), at a thickness of 80 microns. Another layer of PET/ITO transparent electrode was covered on the light-control layer wet film to obtain a wet film containing a light-control layer, which was then cured in a nitrogen atmosphere for 1 minute using the X200-150 UV curing machine produced by Aventk Company, at a UV power of 700 $W/m^2$, to obtain the LV-0 light valve.

Figure 3:
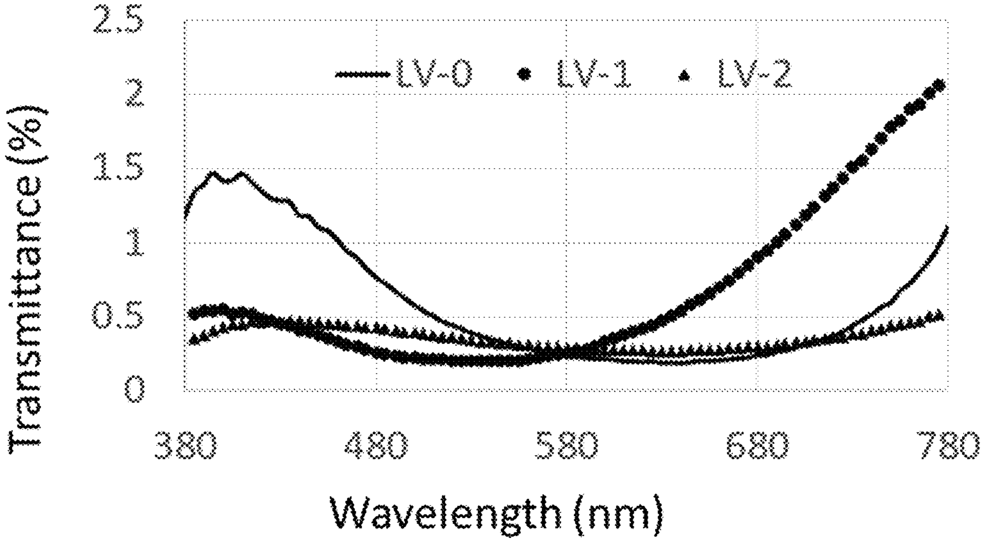
FIG. 3 is a comparison chart of the dark-state transmission spectra of the light valves obtained in Comparative Example 3, Example 7 and Example 8 of the present disclosure.

In a case that no voltage was applied (off state), LV-0 displayed a blue tone and had a total light transmittance rate of 0.7%. The spectrum thereof is shown in FIG. 3. The absorption peak is located at 630 nm, showing a blue tone. In a case that 50 Hz 110 V AC (on state) was applied, LV-0 became clear and had a total light transmittance rate of 69.5%. The specific results are shown in Table 1.

In this example, the transparent conductive film (transparent electrode) was formed on the substrate of the plastic sheet.

The polymer matrix precursor was cross-linked and cured to form a polymer matrix.

Therefore, the present disclosure further provides a method for preparing a light valve, comprising:

providing a solid light-control particle;

providing a suspension medium;

mixing the solid light-control particle and the suspension medium to form a mixture of the suspension medium containing the solid light-control particle;

providing a polymer matrix precursor;

mixing an initiator that initiates cross-linking and curing of the polymer matrix precursor, the mixture of the suspension medium containing the solid light-control particle, and the polymer matrix precursor to obtain a light-control layer matrix emulsion;

coating the above-mentioned light-control layer matrix emulsion on the first transparent electrode of the first transparent substrate to form a light-control layer wet film;

covering the second transparent electrode of the second transparent substrate on the light-control layer wet film;

cross-linking and curing the light-control layer wet film to obtain the light valve device as shown in FIG. 1.

Example 7: Preparation of LV-1 Light Valve from LCP-1

Preparation and test were performed according to Comparative Example 3, except that LCP-0 was replaced with LCP-1, and the obtained light valve was called LV-1. The specific results are shown in Table 1. The UV-visible spectrum of LV-1 in dark state is shown in FIG. 3. Compared with LV-0, the absorption peak of LV-1 is located at 535 nm, and the light valve had a red tone.

Example 8: Preparation of LV-2 Light Valve from LCP-2

Preparation and test were performed according to Comparative Example 3, except that LCP-0 was replaced with LCP-2, and the obtained light valve was called LV-2. The specific results are shown in Table 1. The UV-visible spectrum of LV-2 in dark state is shown in FIG. 3. Compared with LV-0, there was no obvious absorption peak of LV-2, and the light valve had a gray tone.

Example 9: Preparation of LV-3 Light Valve from LCP-3

Preparation and test were performed according to Comparative Example 3, except that LCP-0 was replaced with LCP-3, and the obtained light valve was called LV-3. The specific results are shown in Table 1.

Example 10: Preparation of LV-4 Light Valve from LCP-4

Preparation and test were performed according to Comparative Example 3, except that LCP-0 was replaced with LCP-4, and the obtained light valve was called LV-4. The specific results are shown in Table 1.

Example 11: Preparation of LV-5 Light Valve from LCP-5

Preparation and test were performed according to Comparative Example 3, except that LCP-0 was replaced with LCP-5, and the obtained light valve was called LV-5. The specific results are shown in Table 1.

Example 12: Preparation of LV-6 Light Valve from LCP-6

Preparation and test were performed according to Comparative Example 3, except that LCP-0 was replaced with LCP-6, and the obtained light valve was called LV-6. The specific results are shown in Table 1

Comparing LV-0 with LV-1 to LV-6, it is proved that the non-blue solid light-control particle light valve still maintained the light-control performance of the light valve in the comparative example.

TABLE 1

Comparison of light valve performance

| Example | Light valve number | Color of dark state | Lab | Total light transmittance rate % Off state | Total light transmittance rate % On state at 110 V |
|---|---|---|---|---|---|
| Example 7 | LV-1 | Red | 31.53, 3.35, −1.12 | 0.8 | 64.1 |
| Example 8 | LV-2 | Gray | 30.76, 0.02, 0.58 | 0.5 | 63.1 |
| Example 9 | LV-3 | Gray | 22.52, 0.30, −1.02 | 0.7 | 66.5 |
| Example 10 | LV-4 | Green | 38.51, −2.03, 1.02 | 0.4 | 62.8 |
| Example 11 | LV-5 | Gray | 32.45, 0.27, −1.27 | 0.6 | 62.3 |
| Example 12 | LV-6 | Gray | 33.72, 0.15, −0.81 | 1.0 | 69.1 |
| Comparative Example 3 | LV-0 | Blue | 31.5, −1.22, −7.61 | 0.7 | 69.5 |

Tests have shown that the non-blue light valve of the present disclosure had a total light transmittance rate reaching 69.1%, and showed L=33.72, a=0.15, b=−0.81 in the CIELab color coordinate, which effectively overcomes the shortcoming in the prior art that the dark state of the light valve is blue tone.

The present disclosure is described with a light valve with a transparent plastic sheet as the substrate, that is, a light-control film, as an embodiment. Apparently, the idea of the present disclosure is also fully applicable to a light valve with glass as the substrate, that is, a light-control glass.

The type of the transparent electrode with glass as the substrate is not particularly limited, which can be conventional conductive glass that is well known to those skilled in the art, including ITO conductive glass, FTO conductive glass, FZO conductive glass, IZO (Indium Zinc Oxide) conductive glass, GZO (Ga. ZnO) conductive glass or AZO (Al-doped ZnO) conductive glass, and the like.

In addition, the present disclosure further provides a light-control glass component, comprising a first glass plate, a second glass plate, and a light-control film disposed between the first glass plate and the second glass plate; wherein: a first laminated layer is provided between the first glass plate and the above-mentioned light-control film, and/or a second laminated layer is provided between the second glass plate and the above-mentioned light-control film.

In the present disclosure, the types of the first glass plate and the second glass plate are not particularly limited, which can be conventional transparent glass used for a light-control glass component that is known to those skilled in the art, including ordinary glass such as inorganic glass, organic glass, or functional glass, such as UV blocking glass, IR blocking glass, Low-E glass, tempered glass or antibacterial glass, and the like.

In the present disclosure, the types of the first laminated layer and the second laminated layer are not particularly limited, which can be a conventional laminated layer used for a light-control glass component that is well known to those skilled in the art, including a EVA film, TPU film and PVB film, or a functional film, such as a UV blocking EVA film, UV blocking TPU film, UV blocking PVB film, and the like.

In the present disclosure, the method for preparing a light-control glass component is not particularly limited, which can be a conventional lamination method of a light-control glass component in the art, such as lamination in a laminator, or an autoclave or a lamination box/furnace.

In summary, the present disclosure uses different metal organic complexes or different reaction conditions to obtain a non-blue solid light-control particle. The light valve prepared with the non-blue solid light-control particle of the present disclosure has a total light transmittance rate reaching 69.1%, which overcomes the shortcoming that the dark state of a light valve is blue tone in the previous technology, achieves good technical effects, has good application prospects, and is of great significance.

The above examples are only for illustration and do not limit the scope of the present disclosure. Based on the embodiments of the present disclosure, all other embodiments obtained by those of ordinary skill in the art without making inventive efforts belong to the scope of the present disclosure. Unless otherwise stated, all chemicals used in the examples were purchased from Sigma Aldrich. In all these examples, all parts and percentages are by weight unless otherwise stated. The light transmittance rate of the LV light valve was measured with an Oceanview spectrometer, and the color difference data was measured with the LS171 colorimeter of Linshang Technology.

The invention claimed is:

1. A light valve device, comprising:

a first transparent substrate, a first transparent electrode formed on the first transparent substrate, a second transparent substrate, a second transparent electrode formed on the second transparent substrate, wherein the first transparent electrode and the second transparent electrode are arranged opposite to each other, and a light-control layer disposed between the first transparent electrode and the second transparent electrode; wherein the light-control layer comprises a polymer matrix;

wherein, suspension medium droplets are dispersed in the polymer matrix, and solid light-control particles are distributed within the suspension medium droplets;

the solid light-control particle is formed from raw materials comprising the following components: iodine, main group metal iodide, transition metal organic complex and/or rare earth metal organic complex, nitrogen-containing organic ligand and nitrocellulose;

the light valve device has a non-blue tone in the dark state and is transparent in the bright state;

the non-blue tone is: in the CIELab color coordinate, $10<L<40$, $-5<a<5$, $-1.5<b<5$.

2. The light valve device according to claim 1, wherein a mass ratio of the iodine, main group metal iodide, transition metal organic complex and/or rare earth metal organic complex, nitrogen-containing organic ligand and nitrocellulose is 1:(0.2~1):(0.05~1):(0.2~2):(0.01~3).

3. The light valve device according to claim 1, wherein the main group metal iodide is selected from the group consisting of lithium iodide, sodium iodide, potassium iodide, rubidium iodide, cesium iodide, ammonium iodide, magnesium iodide, calcium iodide, strontium iodide, barium iodide, indium iodide, tin iodide, lead iodide and a combination thereof;

the transition metal organic complex and/or rare earth metal organic complex is selected from the group consisting of titanium acetylacetonate (III), titanium acetylacetonate (IV), vanadium acetylacetonate, chromium acetylacetonate, manganese acetylacetonate (II), manganese acetylacetonate (III), iron acetylacetonate (II), iron acetylacetonate (III), cobalt acetylacetonate (II), cobalt acetylacetonate (III), nickel acetylacetonate, copper acetylacetonate, zirconium acetylacetonate, molybdenum acetylacetonate, ruthenium acetylacetonate, rhodium acetylacetonate, palladium acetylacetonate, iridium acetylacetonate, yttrium acetylacetonate, lanthanum acetylacetonate, cerium acetylacetonate, europium acetylacetonate, dysprosium acetylacetonate, ferrocene, cobaltenocene, nickelrocene, manganocene, titanocene, chromocene, cuprocene, ruthenocene, vanadocene, zirconocene, lanthanocene, copper phthalocyanine, nickel phthalocyanine, zinc phthalocyanine, cobalt phthalocyanine, iron phthalocyanine, vanadium phthalocyanine, manganese phthalocyanine, chromium phthalocyanine, ruthenium phthalocyanine, zirconium phthalocyanine, lanthanum phthalocyanine, copper porphyrin, cobalt porphyrin, nickel porphyrin, iron porphyrin, vanadium porphyrin, ruthenium porphyrin, zirconium porphyrin, lanthanum porphyrin and a combination thereof;

the nitrogen-containing organic ligand is selected from a nitrogen-containing heterocyclic carboxylic acid ligand and/or a nitrogen-containing heterocyclic carboxylic acid ester ligand.

4. The light valve device according to claim 1, wherein the nitrogen-containing organic ligand is selected from the group consisting of compounds represented by Formula (1) to Formula (16):

Formula (1)

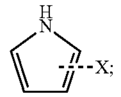

in Formula (1), X is $(COOH)_n$ or $(COOR)_n$, and n is an integer from 1 to 4;

Formula (2)

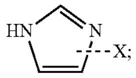

in Formula (2), X is $(COOH)_n$ or $(COOR)_n$, and n is an integer from 1 to 3;

Formula (3)

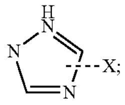

in Formula (3), X is $(COOH)_n$ or $(COOR)_n$, and n is an integer between 1 and 2;

Formula (4)

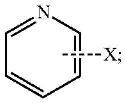

in Formula (4), X is $(COOH)_n$ or $(COOR)_n$, and n is an integer from 1 to 5;

Formula (5)

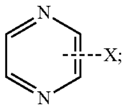

in Formula (5), X is $(COOH)_n$ or $(COOR)_n$, and n is an integer from 1 to 4;

Formula (6)

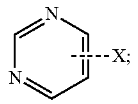

in Formula (6), X is $(COOH)_n$ or $(COOR)_n$, and n is an integer from 1 to 4;

Formula (7)

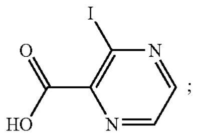

Formula (8)

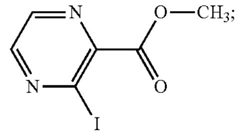

Formula (9)

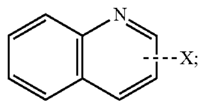

in Formula (9), X is $(COOH)_n$ or $(COOR)_n$, and n is an integer from 1 to 7;

Formula (10)

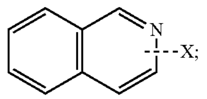

in Formula (10), X is $(COOH)_n$ or $(COOR)_n$, and n is an integer from 1 to 7;

Formula (11)

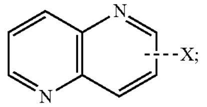

in Formula (11), X is $(COOH)_n$ or $(COOR)_n$, and n is an integer from 1 to 6;

Formula (12)

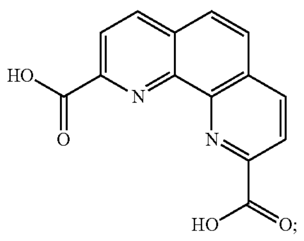

-continued

Formula (13)

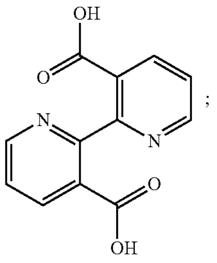

Formula (14)

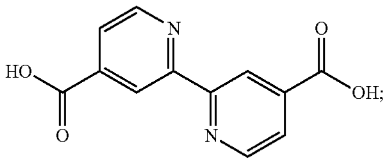

Formula (15)

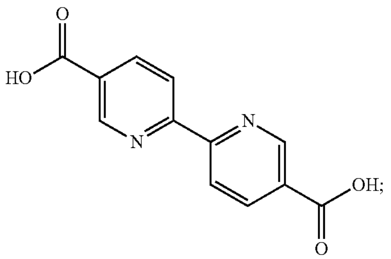

Formula (16)

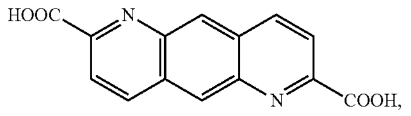

and a combination thereof;

wherein, R in Formulas (1) to (6) and Formulas (9) to (11) are each independently selected from C1 to C6 alkyl.

5. The light valve device according to claim 1, wherein the solid light-control particle has a particle length of 50 nm to 800 nm; the solid light-control particle has a particle aspect ratio of 2 to 30.

6. The light valve device according to claim 1, wherein the polymer matrix is formed by cross-linking and curing of a silicone oil polymer matrix precursor having unsaturated bonds;

the suspension medium droplet is a non-conductive liquid, which is selected from the group consisting of fluorocarbon organic compound, phthalate, trimellitate, dodecylbenzene, polybutylene oil, polyacrylate, polymethacrylate, epoxidized soybean oil, epoxidized linseed oil and a combination thereof.

7. The light valve device according to claim 1, wherein the first transparent substrate and the second transparent substrate comprise a glass plate; or the first transparent substrate and the second transparent substrate comprise a transparent plastic sheet;

the first transparent electrode is selected from the group consisting of ITO, FZO, IZO, GZO, AZO, a nano-Ag wire, conductive graphene, a nano-Cu wire and a combination thereof; the second transparent electrode is selected from the group consisting of ITO, FZO, IZO, GZO, AZO, a nano-Ag wire, conductive graphene, a PEDOT conductive layer, a nano-Cu wire and a combination thereof.

8. The light valve device according to claim 1, wherein an insulating layer is provided on the first transparent electrode and/or the second transparent electrode.

9. A method for preparing the light valve device according to claim 1, comprising:

providing a solid light-control particle;

providing a suspension medium;

mixing the solid light-control particle and the suspension medium to form a mixture of the suspension medium containing the solid light-control particle;

providing a polymer matrix precursor;

mixing an initiator that initiates cross-linking and curing of the polymer matrix precursor, the mixture of the suspension medium containing the solid light-control particle, and the polymer matrix precursor to obtain a light-control layer matrix emulsion;

coating the above-mentioned light-control layer matrix emulsion on the first transparent electrode of the first transparent substrate to form a light-control layer wet film;

covering the second transparent electrode of the second transparent substrate on the light-control layer wet film; and cross-linking and curing the light-control layer wet film to obtain the light valve device.

10. A solid light control particle, formed from raw materials comprising the following components: iodine, main group metal iodide, transition metal organic complex and/or rare earth metal organic complex, nitrogen-containing organic ligand and nitrocellulose.

11. A method for preparing a solid light-control particle, comprising:

S1) mixing iodine, main group metal iodide, transition metal organic complex and/or rare earth metal organic complex, nitrocellulose and an organic solvent, then adding low carbon alcohol, distilled water and nitrogen-containing organic ligand, and reacting under stirring to obtain a reaction solution;

S2) centrifuging the reaction solution under a condition of not higher than 5000 g to obtain a supernatant;

S3) centrifuging the supernatant under a condition of not less than 10,000 g to obtain the solid light-control particle.

12. The method according to claim 11, wherein the organic solvent is selected from isoamyl acetate;

the number of carbon atoms of the low carbon alcohol is less than 8;

the mixing is conducted at a temperature of 5° C. to 150° C.;

the reacting under stirring is conducted at a temperature of 5° C. to 150° C. for 0.1 h to 20 h;

the centrifuging in step S2) is performed for 0.2 h to 2 h;

the centrifuging in step S3) is performed for 0.5 h to 20 h.

13. A light-control glass component, comprising a first glass plate, a second glass plate, and the light valve device according to claim 1 disposed between the first glass plate and the second glass plate; the first transparent substrate and the second transparent substrate are transparent plastic sheets;

a first laminated layer is provided between the first glass plate and the light valve device, and/or a second laminated layer is provided between the second glass plate and the light valve device.

* * * * *